United States Patent [19]

Chun et al.

[11] 4,038,559
[45] July 26, 1977

[54] REGULATED UNINTERRUPTIBLE POWER SUPPLY

[75] Inventors: Ping Sun Chun, Morristown; Patrick William Clarke, Murray Hill; Kenneth William Gardner, Hopatcong, all of N.J.

[73] Assignee: Bell Telephone Laboratories, Incorporated, Murray Hill, N.J.

[21] Appl. No.: 651,644

[22] Filed: Jan. 23, 1976

[51] Int. Cl.² .............................................. H02J 9/00
[52] U.S. Cl. ........................................ 307/64; 307/51; 363/90
[58] Field of Search ................... 307/64, 51, 66, 43, 307/23, 85, 86, 72; 340/333; 321/2, 18

[56] References Cited

U.S. PATENT DOCUMENTS

| | | | |
|---|---|---|---|
| 3,398,292 | 8/1968 | Kuba | 307/51 |
| 3,660,749 | 5/1972 | Kadri | 321/18 |
| 3,668,508 | 6/1972 | Archer et al. | 321/18 |
| 3,769,571 | 10/1973 | Wilkinson | 307/64 |

Primary Examiner—Robert K. Schaefer
Assistant Examiner—Morris Ginsburg
Attorney, Agent, or Firm—Alfred G. Steinmetz

[57] ABSTRACT

An uninterruptible power supply derives regulated power from either a primary power source or a reserve power source. A power flow control unit derives the output power as needed from either one or both power sources. Its operating characteristics are selected so that complicated transfer and disconnect circuitry is eliminated.

24 Claims, 6 Drawing Figures

REGULATED UNINTERRUPTIBLE POWER SUPPLY

BACKGROUND OF THE INVENTION

1. Field of the Invention

This invention relates to uninterruptible power supply systems and, in particular, to power supply systems having plural power sources which normally include a primary power source and a reserve power source. It is specifically concerned with a power flow control system to control the flow of power from plural, independent power sources to an output load to be energized.

2. Description of the Prior Art

Modern electronic systems require extremely reliable sources of power. Examples of electronic systems needing reliable power include computers, data processors, process controllers, and communications equipment. In general, the available commercial power supplied by utilities is not sufficiently reliable to meet the power needs of such equipment. Commercial power is sometimes subject to complete outages or, in other words, complete failure of the power signal. More often, due to inadequate capacity and increasing load demands, it is subject to a condition known as "brownout" which normally occurs during peak demand periods and usually is typically represented by a three to eight percent drop in the magnitude of the available voltage. Commercial power is very frequently subject to magnitude and phase instabilities causing irregular voltage waveforms due to transients induced by the action of various customers who subject the system to sudden electrical loads. These various changes in the characteristics of the voltage supplied by commercial sources may have significant adverse effects on the operation of electronic equipment like computers.

To operate properly, a computer requires a precisely regulated, continuous power signal. The fluctuations it can tolerate from a power source are extremely limited. The computer can probably tolerate momentary spikes and dips in the voltage if the duration is only a few milliseconds. It can probably also tolerate a slight brownout for a short period of time not exceeding 100 milliseconds. Should the brownout equal perhaps an eight percent voltage drop and last beyond 100 milliseconds, it is possible that the computer could malfunction or shut down. Should the brownout voltage drop be ten percent or greater for a period of time exceeding 100 milliseconds, there is a very definite possibility that processing errors may occur requiring partial program reruns. In instances of severe brownout where the drop in voltage magnitude may exceed 25 percent, the computer will probably go into total shutdown, and if the power drops abruptly the computer will also terminate operations probably with a high possibility of component damage and of adverse effects on the integrity of the stored data.

It is therefore apparent that for safe, reliable operation a computer needs a source of continuous, regulated power having very stable characteristics. Since the power normally supplied by commercial power companies does not possess the necessary stability for safe operation of computers, it is customary to supply the power to computers with uninterruptible power supplies. Uninterruptible power supplies include plural sources of power which usually operate in conjunction with each other to provide a continuous power output to some load to be energized. The plural sources generally include a commercial AC power source and an auxiliary independent source of power to supplement or substitute for the commercial AC power as required in order to supply the necessary continuous and stable power input to the load to be energized.

One simple method of providing an uninterruptible power supply is to connect a charger and rectifier to the commercial AC power source. The rectified output is connected in parallel with a reserve battery-type power source and both sources are used to drive an inverter circuit from which the power signal to energize the computer is derived. This power supply arrangement requires few parts and is relatively simple in design. However, there is no redundancy to provide power to the load should the inverter fail. It is generally recognized that inverters are fairly reliable but they are generally incapable of handling rapid load change demands which generally result in overcurrent, short circuits, or in-rush current conditions. A rapid load transfer can create signal disturbances which will destroy the inverter.

To avoid these problems, uninterruptible power supplies have been designed where the primary commercial power source and the reserve power source are connected in parallel. Both the primary power source and the reserve power source are continuously operated and both sources contribute to the energization of the load. This is a completely redundant system and should either power source fail the results are not apparent to the load which is continuously energized. Such an uninterruptible power supply system typically uses a ferroresonant transformer with two input primaries which are coupled to energize a single secondary. Through the use of properly designed high reluctance shunts, the two power sources do not transmit power to each other. Both power sources cooperate to share the load's power needs. The disadvantage of this particular arrangement is the expensive transformer design of a ferroresonant transformer having carefully designed high reluctance shunts and symmetrical construction to permit the two power sources to share the load.

An uninterruptible power supply arrangement which permits use of a less expensive power coupling arrangement is commonly known as the "transfer type" of uninterruptible power supply. Generally, a commercial AC line power source and a DC voltage energized inverter power source are connected in parallel to a switching mechanism which alternately couples one or the other of the two power supplies to a load to be energized. This power supply design advantageously eliminates the need for an expensive ferroresonant transformer and provides redundancy to provide a substantially uninterruptible power to the load. However, the need for switching devices reduces the reliability of the circuit. In addition, the auxiliary power source comprising the inverter must be synchronized in frequency with the AC power line signal which requires complicated synchronizing circuitry. The switching action must be sufficiently fast to handle the transition of a load from a failed AC power line to the reserve power source or inverter circuit without inducing damaging transient signals into the circuit. The switching must disconnect the failed power source so it does not become a load for the active power source. Additionally, should the inverter fail, it would only be discovered at the time it is needed most, i.e., at the moment of a power transfer.

It is therefore an object of this invention to improve the dynamic load transfer characteristics of an uninterruptible power supply and eliminate synchronizing requirements between two independent power sources.

It is another object to reduce the size and simplify the control circuitry required for an uninterruptible power supply.

It is another object of the invention to prevent the flow of energy from one input of the uninterruptible power supply to another input of the uninterruptible power supply without the necessity of complex switching arrangements.

It is yet another object of this invention to minimize signal disturbances transmitted to the load during the transfer from one power source to another.

SUMMARY OF THE INVENTION

Therefore, in accord with the invention, a no-break uninterruptible power supply system utilizes a high reactance linear transformer which has two input windings and a single output winding. One input winding is connected to a commercial AC power line, the other input winding is connected to a gating circuit which operates to control the flow of power from the AC line to a load connected to the output winding. The gating circuit is connected to a second or reserve power source and is configured to supply power to the load to supplement or replace the commercial AC power. The flow of power from the commercial AC line to the load is controlled by utilizing the gating circuit to control periodic power transmission intervals through the transformer. This controlled power transmission interval is a form of pulse width modulation control.

If the commercial AC power fails completely, the gating arrangement couples a second power source to the second input winding to supply the total power requirements of the load. The gates are operated in a converter mode to supply a controlled power level from the second power source to the load. If the commercial AC power is suffering a brownout condition, the gates operate to supply supplementary power to the load to maintain the output signal at the regulated value.

The frequency of operation of the gates is selected to be significantly higher than the frequency of the commercial AC power. According to the invention, the gate switching frequency is not constrained to be synchronous with the commercial AC signal. Hence, due to the high reactance of the transformer or of a selected discrete inductance at this high switching frequency, no power can be fed from the second input winding to the first input winding thereby eliminating the need for disconnect circuitry to protect the commercial AC line from reverse power flow during converter operation of the gate circuitry.

In a transformer system, power flow from a primary source to a secondary load requires that the power signals be coherent between the input and output sides of the transformer. Since the gating circuit operates at a high frequency unrelated to the AC line frequency system, coherency between the input and output sides of the circuit is achieved through the means of line current commutating control. The controlled interval gating to achieve the pulse width modulation has its pulse polarity controlled in response to the actual polarity of the commercial AC signal during each half cycle thereby creating the necessary coherency.

The described uninterruptible power supply system herein advantageously permits regulation with a simple control circuit and eliminates the need for an expensive ferroresonant transformer. It also advantageously eliminates the need for complicated synchronizing circuitry to synchronize the commercial AC power source and the reserve power source. It further eliminates the need for complicated disconnect switching arrangements since the flow of energy is unidirectional to the load, being unable to flow back to a disabled AC input.

DETAILED DESCRIPTION

Figure 1:
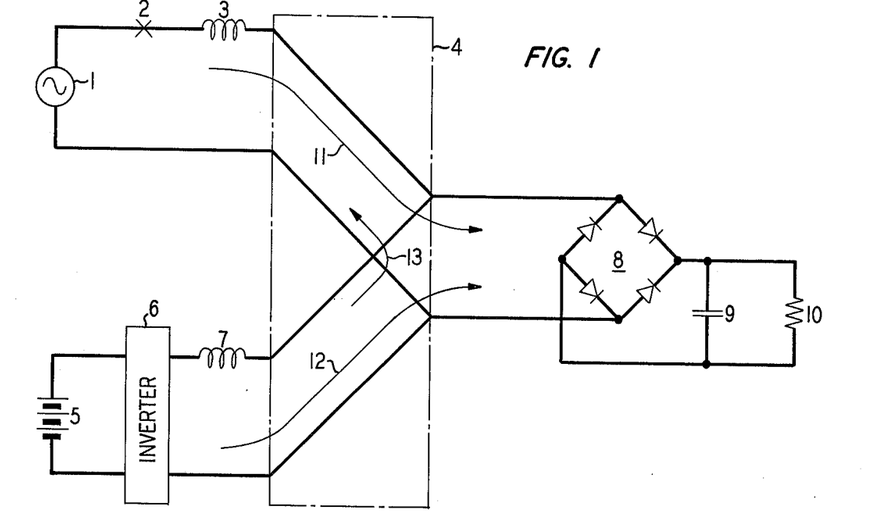
FIG. 1 discloses an uninterruptible power supply of the transfer type for the purpose of illustrating the principles of power flow through such a system.

A transfer type uninterruptible power supply is shown in FIG. 1 wherein a power signal to energize a load 10 may be derived solely from a commercial AC power source 1, or be derived from a reserve battery power source 5, or may be derived from both sources simultaneously. As disclosed, a commercial AC power source 1 is shown connected through a connector 2 and an inductor 3 to a coupling circuit 4. Similarly, a battery 5 is shown connected to an inverter circuit 6 which in turn is connected through an inductor 7 to the coupling circuit 4. While the coupling circuit 4 has shown within it two wire paths connected in parallel to the output rectifier 8, this is symbolic only. The coupling circuit 4 may comprise a transformer having two primary windings and a single secondary winding, or it may comprise a rapid transfer switching circuit. The output of the coupling circuit 4 is connected to a full wave rectifier 8 which in turn is connected to a filter capacitor 9 and may be connected to an output load 10.

Power flow from the commercial AC power source 1 would normally follow the path defined by the arrow 11. Power flow from the inverter circuit 6 would normally follow the path defined by the arrow 12. The inductances 3 and 7 may be discrete reactances or may be a transformer reactance. The connector 2 is utilized to disconnect the power supply from the commercial AC source 1 whenever the inverter 6 is operating to supply power to the load, and hence prevent power flow from the inverter 6 to the commercial AC line by a path as shown by arrow 13.

Figure 2:
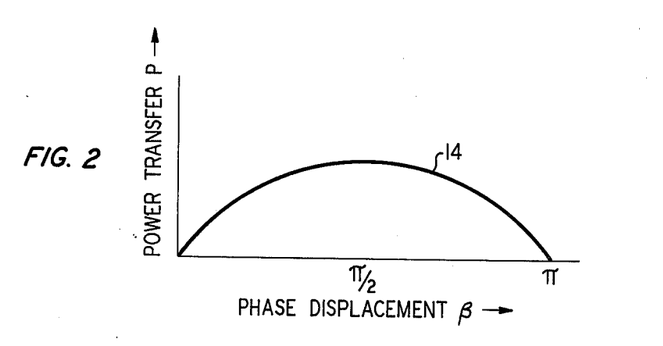
FIG. 2 is a graphic representation of the power flow function through such a system.

The magnitude of power flow from either source to the load is a function of the phase displacement between the input voltage of the source and the output voltage and is shown in diagrammatic form in FIG. 2. The magnitude of power transfer from input to output as shown by FIG. 2 is a function of the phase angle difference $\beta$ between the input and output signal waveforms. The power transfer function is shown by waveform 14. It is apparent therefrom that the maximum power transfer occurs when the phase displacement between input and output voltage waveforms is $\beta = 90°$, where the output waveform lags the input waveform by 90°.

Hence, during normal operation of the uninterruptible power supply, when the commercial AC line power source provides the full power, the inverter is operated so that the phase displacement between the inverter's output voltage and the power supply output voltage is zero degrees. The phase displacement between the commercial AC line power voltage and the output voltage is some finite value between zero and 90°. If the commercial AC line power suffers a brownout, the phase of the inverter output is changed so that it supplies sufficient power to the output to supplement the power normally supplied by the AC line power. If the commercial AC line power fails completely, connector 2 is opened to disconnect the line from the uninterruptible power supply and the inverter operates freely to supply the required output load power.

In prior art circuits, complicated synchronizing circuitry is necessary to synchronize the inverter 6 to the commercial AC line signal supplied by the commercial AC line power source 1 to assure power coherency between the input and output of the power supply. In addition, complicated circuitry is required to respond to the commercial power failure to disconnect it from the line so that the inverter does not feed its power back into the commercial line but rather applies it to the load. This circuitry has to operate additionally to reconnect the commercial power to the uninterruptible power supply as soon as it achieves operating status again and resynchronize the inverter to operate at the same frequency and with zero phase displacement between its output and the output voltage of the uninterruptible power supply.

Figure 3:
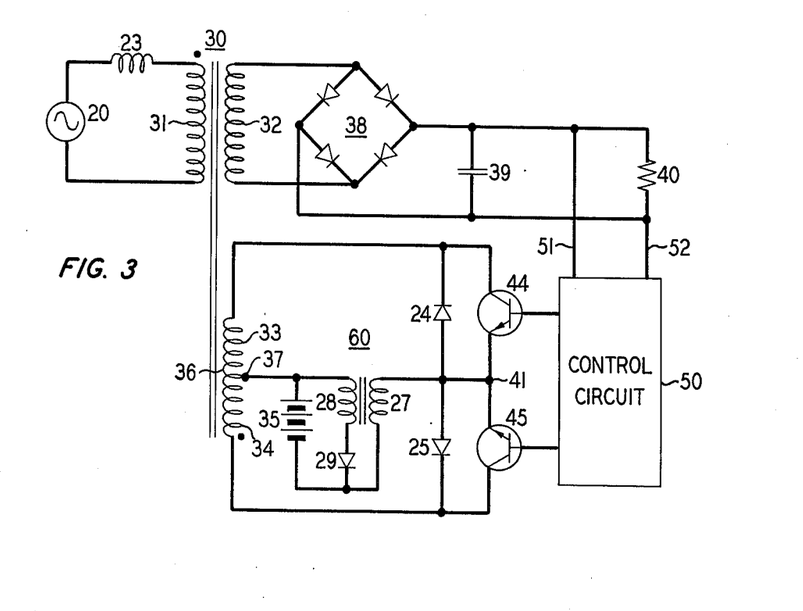
FIG. 3 discloses a regulated uninterruptible power supply of the transfer type embodying the principles of the invention.

An uninterruptible power supply utilizing the principles of the invention is disclosed in FIG. 3. It is designed in accordance with the principles of the invention to operate in three distinct modes of operation. In one mode it operates as a regulated rectifier; in another mode it operates as a converter power supply; and in a third mode the regulator aspect and converter power supply aspect cooperate to provide a combined regulated output signal to the load.

The principles of the invention embody a new and different control strategy to control the flow of power from a primary power source or a reserve power source to a load to be energized. This new arrangement permits a more efficient power supply since there are no energy storage devices needed in the control loop to control the output. It permits the use of lower cost component parts and has the advantage of a wide control range. The control system operates to transfer power of controlling the phase difference between input and output signals as described hereinabove. It includes a feedback control arrangement whereby the phase angle between input and output signals is continuously adjusted to stabilize the output voltage of the power supply.

The basic primary power source is shown in FIG. 3 as a commercial AC line power source 20. This line power source is coupled, via a linear inductor 23, to a primary winding 31 of a transformer 30. The linear inductor 23 may be the inductance due to the high reactance of the transformer 30 or it may be a separate discrete component. The reactance of linear inductance 23 is selected to present a very low impedance at the AC line frequency, but a high impedance to the frequency of the reserve power source. The transformer 30 is a linear transformer and includes in addition to the first primary winding 31 a second primary winding 36 and a secondary winding 32. The secondary winding 32 is coupled to a bridge rectifier circuit 38 which full-wave rectifies the AC signal across winding 32 and applies it to a filtering capacitor 39. The load, herein shown as a resistive load 40, is shown connected across the capacitor 39. While a resistive load is shown in this schematic, load 40 may contain significant reactances without affecting the ability of the power supply to supply a regulated output signal.

The second primary winding 36 is divided into two series connected windings 33 and 34 joined at a common node or center tap 37. The end terminals of winding 36 are connected to the switching transistors 44 and 45. The collector-emitter path of each switching transistor is shunted by a diode 24 or 25 poled in a direction to conduct current in a direction normally opposite the conducting direction of the shunt connected transistor. The center tap 37 of winding 36 is connected to the positive terminal of a DC voltage source 35 which is shown herein as a battery. The opposite or negative terminal of the battery is connected to an energy storage inductor 27 which in turn is connected to node 41 common to the two switching transistors 44 and 45. The battery is shunted by a voltage clamping circuit which includes a winding 28 magnetically coupled to the energy storage inductor 27 and a diode 29. The switching transistors 44 and 45 are controlled in response to a control circuit 50 which supplies the switching drive signal to control the conductivity of transistors 44 and 45. The control circuit operates in response to the output voltage of the power supply which it monitors through the sense leads 51 and 52.

An understanding of the circuit may be best achieved by describing its operation. When the commercial AC line power source 20 is operating properly, that is, its magnitude is at full level, the power supply operates in a regulated rectifier mode. In this operation all the energy or power supplied to the load is supplied by the commercial AC line power source 20. This power is coupled to the primary winding 31 through the linear inductor 23. The linear inductor 23 is selected to have a very small impedance at the frequency of the commercial AC signal. The switching frequency of the power flow control circuit 60 is selected as described below so that the reactance of the linear inductor 23 presents a very high impedance to power signals generated by the power flow control circuit 60. This high impedance is utilized to block the flow of power from the power flow control circuit 60 into a disabled commercial AC line, as described further hereinbelow.

Figure 4A:
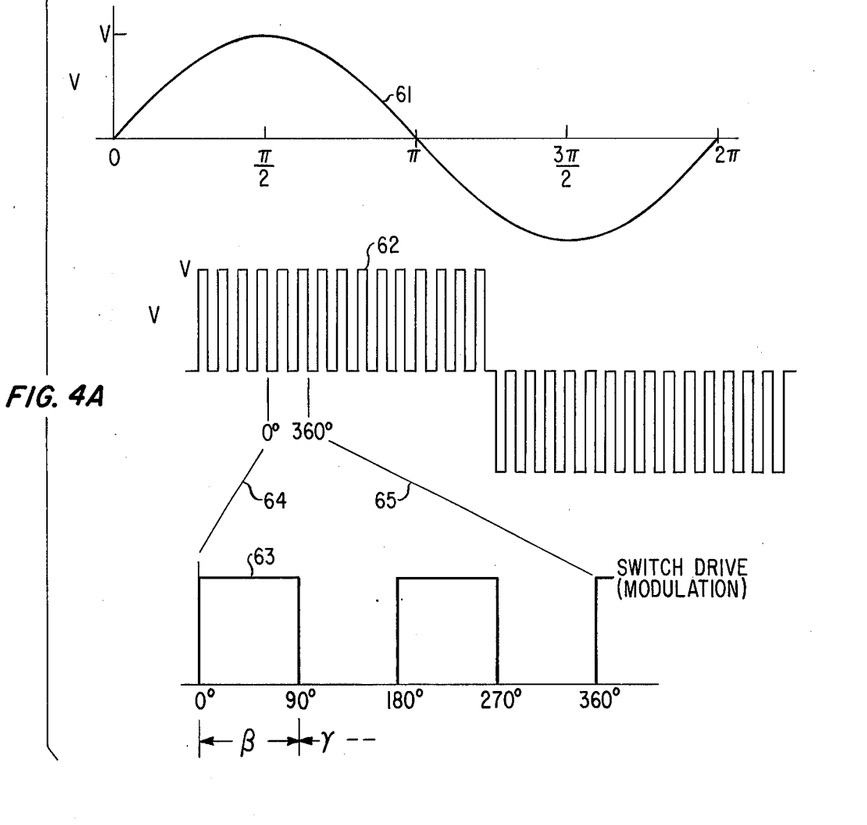
FIGS. 4A and 4B disclose waveforms to show the nature of power flow through the uninterruptible power supply system of FIG. 3.

The AC signal supplied by the commercial power source 20 is applied to the primary winding 31 and is coupled by transformer action of transformer 30 to the secondary winding 32. In order to regulate the output signal on winding 32, the power flow control circuit 60 operates to sample or modulate the transmission of the AC signal from winding 31 to winding 32. The applied sinusoid signal of the commercial AC power source 20 is shown by waveform 61 in FIG. 4A. The control circuit 50 monitors the output voltage delivered to the load 40, via sensing leads 51 and 52, and simultaneously switches transistors 44 and 45 from conducting to nonconducting states at a very high frequency. The switching transistors 44 and 45 during normal or regulated rectifier operation of the power supply are either both biased conducting or they are both biased nonconducting. When the transistors 44 and 45 are both biased into a conducting state, the winding 36 is essentially short-circuited. With winding 36 short-circuited, the flux of the transformer 30 is constrained to be a constant and hence during the short-circuit interval no signal is transmitted from winding 31 to winding 32. When both transistors 44 and 45 are biased nonconducting, a pulse or sample responsive to the energy of the sinusoid AC input signal stored in inductor 23 is applied to winding 31 and is transmitted by transformer action to winding 32. This modulated pulse signal lags the input signal and is illustrated by waveform 62 in FIG. 4A. During the intervals when the winding 36 is short-circuited, there is no voltage drop across the winding 31. During this interval the energy of the AC input signal source is stored in the linear inductor 23. When the winding 36 is open-circuited, during the subsequent time interval, the energy stored in the linear inductor 23 is delivered to winding 31 and is transmitted to the output winding 32. This output power is transmitted via the full wave rectifier 38 and capacitor 39 to the load 40. The pulse width modulated signal appearing across winding 31, as shown by waveform 62 in FIG. 4A, is essentially a pulse width modulated signal having a square wave envelope. The square wave envelope lags the input sinusoid signal by the phase angle $\beta$. The respective durations of the time intervals representing the short-circuit and open-circuit intervals control the amount of power transmitted from primary to secondary. The maximum power transfer occurs when the short-circuit interval equals the open-circuit interval.

The driving signals generated by the control circuit 50 to simultaneously switch transistors 44 and 45 into conduction is shown by waveform 63 in FIG. 4A. Two consecutive driving pulses therein are shown which control transistors 44 and 45 to short-circuit winding 36 and comprise a period which is designated 360°. The duration of the driving pulses controls the duration of zero voltage across winding 31 during which energy is stored in the inductor 23. Waveform 63 can be correlated to waveform 62 by observing the respective scaling of their time scales by following lines 64 and 65. During each half-cycle, in order to transmit maximum power by regulated rectifier action, the driving signal equals 90° or $\pi/2$. If this power is not sufficient it is supplemented as described below. If less power is desired, the pulse width of waveform 63 is controlled to be less than 90°. Hence, the duration of the pulses driving the switching transistors 44 and 45 are modulated to control the energy flow to the output of the power supply. The waveforms 63 are drawn on an expanded time scale as compared to waveform 62. Waveform 62 comprises a series of power pulses transmitted to the output winding 32. A pulse is transmitted during the interval when the winding 36 is open-circuited. These pulses have a square waveform envelope shape in response to the applied sine wave 61 because of the action of inductor 23.

During the regulated rectifier operation of the circuit, the current flowing in the primary winding 36 during the short-circuit interval does not change the flux distribution in the transformer. When both transistors 44 and 45 are conducting, the current flowing in windings 33 and 34 flows in opposite directions so that the total flux in winding 36 cancels. This current flow, however, flows through the energy storage inductor 27 and stores energy therein which is utilized as described below to supplement the input commerical power if necessary.

Figure 4B:
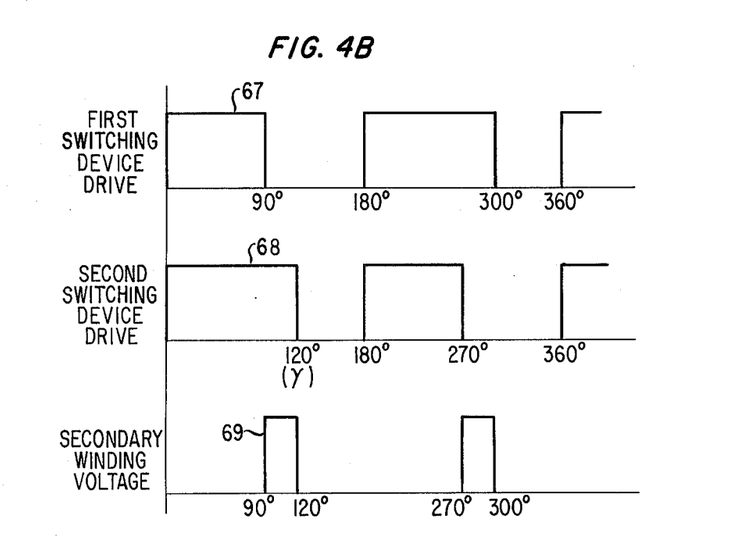

If the input commercial power should fail completely, the uninterruptible power supply operates in a converter mode. As described above, the transistors 44 and 45 during each half-cycle are initially biased simultaneously conducting. Inasmuch as no power is being supplied by the commercial AC source to be transmitted to the output, the control circuit 50 attempts to remedy this by causing both transistors 44 and 45 to conduct for a full 90°. However, at the end of this conducting interval, the power output to the load is not yet at its regulated value. Hence, the control circuit 50 alternately selects one of the transistors 44 or 45 to remain conducting. As described hereinabove, when both transistors 44 and 45 are conducting, the current flow during the short-circuit condition stores energy in the energy storage inductor 27. No energy is stored in the transformer 30 because the flux in windings 33 and 34 cancel each other. Now current flows through only one of the windings 33 or 34 and the energy stored in the energy storage inductor 27 is transmitted through one of these windings to the output winding 32. The base drive signals applied by the control circuit 50 to drive the switching transistors 44 and 45 during this mode of operation are shown in FIG. 4B. During the interval from zero to 90° the two base drive signals 67 and 68 keep both transistors 44 and 45 biased conducting. Past the 90° time mark, however, the control circuit continues the base drive for one of the transistors. This base drive, shown by waveform 68, is continued for a sufficient duration, indicated in the FIG. 4B as angle $\delta$, to allow sufficient energy from inductor 27 to flow into one of the windings 33 or 34 to maintain the regulated output signal across load 40. The waveform 69 represents the signal voltage applied to one of the windings 33 or 34 to supply output power. Windings 33 and 34 are energized during alternate half-cycles by alternately controlling the transistors 44 and 45 to extend conduction in order to avoid the buildup of a DC saturation level in the transformer 30.

The third condition of operation, load sharing, occurs when the commercial AC power source has not failed but its magnitude has degenerated to a level where it is no longer able to supply the required output power. Again, as described with respect to the converter mode of operation, both the transistor switches 44 and 45 are operated simultaneously for the full 90° in an attempt to deliver the required output power. At the end of 90°, one switch is selected to continue conduction in order to deliver supplementary energy to the load.

An advantageous feature of the power supply as described above is that the high frequency of operation of switches 44 and 45 is a frequency at which the linear inductor 23 has a very high impedance and, hence, there is no danger that energy or power generated by the power flow control circuit 60 in its load sharing or converter mode of operation will be fed back into a disabled commercial AC power line. This eliminates the need for complex switching apparatus to disconnect a failed commercial AC power line from the power supply.

A further advantageous feature of the power supply is that the power flow control circuit 60 need in no way be synchronized with the frequency or phase of the commercial AC line source 20. Coherency which is necessary for power flow from winding 31 to winding 32 is guaranteed by the fact that the current flow in the switches 44 and 45 is line-current commutated. That is, the polarity of the modulated pulse is always consistent with the polarity of the commercial AC input signal. This polarity in each case is determined by the polarity of the signal applied to winding 31. This is because the switching arrangement to short winding 36 comprises a bidirectional short-circuit path. Current may flow in one direction through transistor 45 and diode 24 and it may flow in the opposite direction through transistor 44 and diode 25. Therefore, by utilizing the polarity of the input AC signal to control the polarity of the modulation pulses, coherency is established without the need for complex synchronizing systems.

In order to prevent high voltages from being applied to the collector-emitter paths of the switching transistors 44 and 45, a voltage clamping circuit is coupled to the energy storage inductor. The voltage clamping circuit comprises a winding 28 magnetically coupled to the energy storage inductor 27 and a diode 29. When the energy storage inductor 27 is discharging energy the voltage across winding 28 forward biases the diode 29 and permits application of a portion of the stored energy to the battery 35.

Figure 5:
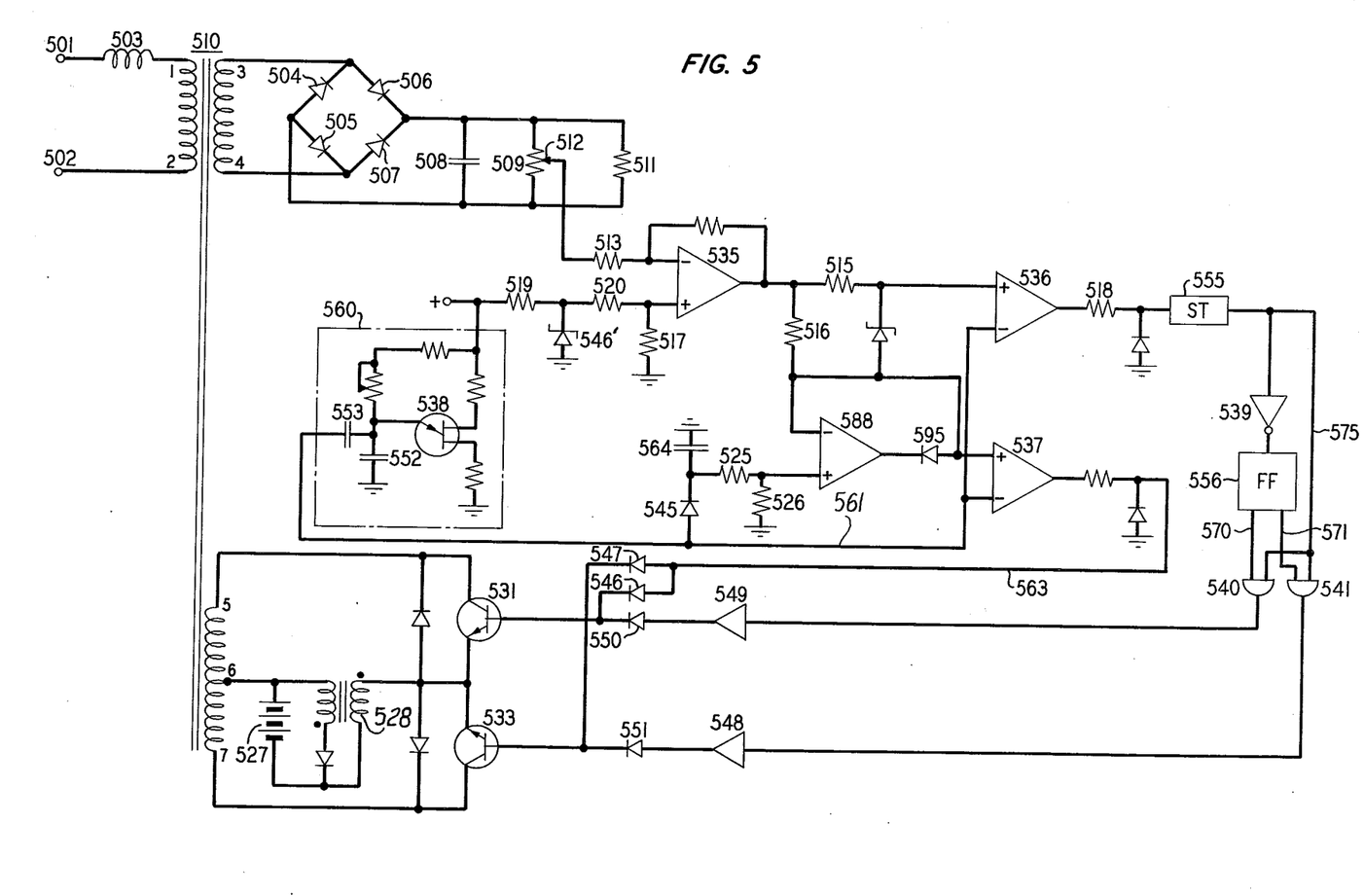
FIG. 5 is a detailed schematic of a regulated uninterruptible power supply of the transfer type embodying the principles of the invention.

The details of a suitable control circuit to control the conductivity of the switching transistors is disclosed in FIG. 5. In FIG. 5 two transistors 533 and 531 are shown in the power flow control circuit. These two transistors 531 and 533 are arranged to be driven by two combined and yet separate independent drive signals. The application of these respective drive signals to the base electrodes of the two transistors 531 and 533 is controlled as described below by the steering diodes 546, 547, 550, and 551. The control circuit generates driving signals which are applied by these steering diodes to cause the power supply to operate in a regulated rectifier mode, a converter mode, or a load sharing mode. As described hereinabove, during the regulated rectifier mode of operation simultaneous drive signals are applied to the two switching transistors 531 and 533. The basic frequency of the drive signals is established by a unijunction transistor oscillator 560 which includes the unijunction transistor 538. The timing circuit of the unijunction oscillator, including the capacitor 552, is adjusted so that the frequency of the oscillator is established at a frequency significantly higher than the frequency of the commercial AC power signal applied to input terminals 501 and 502. For example, this frequency should be at least an order of magnitude greater than the commercial AC signal frequency. The unijunction oscillator 560 generates a sawtooth ramp signal at this high frequency. The operation of the unijunction oscillator is well known in the art and it is not believed necessary to describe its operation herein. This sawtooth ramp signal is applied via the coupling capacitor 553 and lead 561 to the inverting inputs of the operational amplifier comparators 536 and 537.

As described hereinabove, during normal operation the commercial AC power signal applied to input terminals 501 and 502 is coupled through the linear inductor 503 to the primary winding 1-2 of transformer 510. An output signal responsive to this signal appears across the secondary winding 3-4 having magnitude characteristics responsive to the turns ratio and the regulation control. This output signal rectified by a full wave rectifier comprising the diodes 504, 505, 506, and 507 is connected in a bridge type configuration. This rectifier signal is filtered by a filter capacitor 508 and transmitted therethrough to a load 511 to be energized.

An output voltage sensing impedance 509 shunting the load 511 is shown with a wiper arm 512 connected thereto to derive therefrom a voltage representative of the output voltage. The representative voltage is applied, via the resistor 513, to the inverting input of the operational amplifier 535. The comparator 535 has a reference voltage applied to its noninverting input. This reference voltage is generated in response to a DC voltage connected to resistor 519 and zener diode 546'. The reference voltage generated by the zener diode 546' is coupled to a voltage divider comprising resistors 520 and 517. The junction of resistors 520 and 517 is connected to the noninverting input of the operational amplifier comparator 535. As is apparent, as the representative voltage which is applied to the inverting input increases in magnitude, the output voltage of operational amplifier comparator 535 correspondingly decreases. There is an inverse relationship between the representative voltage level and the output voltage level of the operational amplifier 535. The output of the operational amplifier comparator 535 is applied, via the resistors 515 and 516, to the noninverting inputs of the operational amplifier comparators 536 and 537, respectively.

The representative signal level applied to the noninverting input of the operational amplifier comparator 537 controls the duration of its pulse output. This controlled duration pulse controls the conductivity of the switching transistors 531 and 533 during the rectifier operation of the power supply. The voltage input applied to the noninverting input of operational amplifier 537 is proportional to the representative voltage sensed at the sensing impedance 509. The signal input applied to the inverting input of operational amplifier 537 is the sawtooth waveform output of oscillator 560. The sawtooth waveform increases in magnitude linearly with the passage of time. When the voltage magnitude of the sawtooth waveform equals the representative voltage magnitude applied to the noninverting input of operational amplifier 537, the output changes from a positive signal or a high level signal to a low level signal. Hence, the output of the operational amplifier 537 is a pulse signal having a modulated width whose duration is inversely proportional to the magnitude of the output voltage of the power supply. As the magnitude of the output voltage decreases, the duration of the pulse output of operational amplifier 537 increases. This pulse width modulated output is applied, via lead 563, to the two steering diodes 546 and 547. This modulated pulse output simultaneously drives the two transistors 531 and 533 into conduction for a duration which may exist for a time of anywhere from 0° to 90° depending upon the magnitude of the sensed output voltage.

As described hereinabove with respect to FIG. 3, the period of time during which the two switching transistors 531 and 533 are simultaneously conducting does not exceed an interval equal to 90° of the period of operation. In order to keep the simultaneous conduction of transistors 531 and 533 at 90° or less, the operational amplifier 588 is included to inhibit the pulse width modulated drive pulse output of operational amplifier 537 to an interval of 90° or less. The sawtooth waveform output of the oscillator 560 is applied, via a diode 545, to a peak detector capacitor 564. The voltage that exists on capacitor 564 is equal to the peak voltage of the sawtooth waveform. This voltage is applied to a voltage divider comprising two equal impedance resistors 526 and 525. The voltage at the common junction of these two resistors 526 and 525 is approximately equal to one-half the peak voltage of the sawtooth waveform. This voltage is applied to the noninverting input of the operational amplifier 588.

The output of the operational amplifier comparator 535 is, as described above, inversely proportional to the output voltage. The output of operational amplifier 535 is coupled, via resistor 516, to the inverting input of the operational amplifier 588. The output of operational amplifier 535 is also coupled via resistor 516 and diode 595 to the output of the operational amplifier 588. During normal operation the resistors 515 and 516 exhibit little or no voltage drop because of the extremely low current flow due to the high input impedance of the operational amplifiers 536, 537, and 588. This low current condition continues as long as the output of the operational amplifier 535 is sufficiently low. The diode 595 during these periods is back biased with no current flow to the output of operational amplifier 588.

When, in response to a drop in the sensed representative voltage, the output of the operational amplifier 535 switches to a high output level, the diode 595 becomes forward biased and, due to the low output impedance of the operational amplifier 588, a measurable current now flows from the operational amplifier 535 through the resistor 516 and the now forward biased diode 595 to the output of the operational amplifier 588. The voltage drop across the resistor 516 lowers the input voltage to the noninverting input of the operational amplifier 537 and in conjunction with the output of operational amplifier 588 clamps the voltage level which can be achieved at the noninverting input of the operational amplifier 537 so that its pulse output duration is incapable of exceeding the desired 90° limit. Hence, it is apparent that the drive signal to bias the two switching transistors 531 and 533 simultaneously conducting cannot exceed the desired 90° limit.

When it is desired to supply power from the battery voltage source 527, such as is the case during brownout when the load must be shared and during AC power failure, either transistor 531 or 533 must be maintained conducting beyond the 90° limit while the other transistor is biased nonconducting. The pulse width modulated drive signal to continue the conduction of one or the other of these transistors beyond the 90° limit is supplied from the output of the operational amplifier comparator 536. Prior to the 90° limit, the operational amplifier 536 generates a pulse output which is identical in form and duration to the normal drive signal supplied by the output of operational amplifier 537. As described above, the duration of the output of the operational amplifier 537 cannot exceed 90After 90° have been achieved, the operational amplifier 536 may continue to operate to generate a pulse output whose duration is continuously responsive to the output voltage of the power supply.

The output of the operational amplifier 536 is applied, via a resistor 518, to a Schmidt trigger circuit 555 which is included to precisely square the pulse waveform. The output of the Schmidt trigger circuit is applied to a buffer inverter circuit 539, and from thence to the toggle input of a flip-flop 556 which operates to effectively divide the frequency of the input signal by two, producing on its alternate outputs 570 and 571 pulse signals at one-half the frequency of the basic driving oscillator 560. The two output signals are applied respectively to the AND gates 540 and 541 which alternately gate the pulse output signal of the Schmidt trigger circuit 555 on lead 575. The outputs of the AND gates 540 and 541 are applied, via the buffer amplifiers 548 and 549 and the steering diodes 550 and 551, to the switching transistors 531 and 533, respectively. Inasmuch as the pulse outputs of AND gates 540 and 541 occur alternately, it is apparent that the switching transistors 531 and 533 are alternately biased conducting each for a controlled duration to enable the transmission of power stored in the energy storage inductor 528 through the transformer to the output load to be energized.

What is claimed is:
1. An uninterruptible power supply comprising
a power transformer including a first, second, and third access winding,
means for accepting an AC source coupled to said first winding,
means for accepting a load coupled to said second winding,
power flow control means including gating means coupled to said third winding, means for accepting a reserve source of energy coupled to said gating means, first means for controlling said gating means in order to short-circuit said third winding for controlled intervals of time, and second means for controlling said gating means to enable power flow from said reserve source of energy to said second winding.

2. An uninterruptible power supply as defined in claim 1 wherein said means for accepting an AC source includes a frequency responsive impedance, said AC source selected to have an operation frequency at which the impedance magnitude of said frequency responsive impedance is low and said gating means operating at a frequency at which the impedance of said frequency responsive impedance is high.

3. An uninterruptible power supply as defined in claim 1 wherein said gating means comprises a first and second transistor connected in series, conductively poled in opposite directions and shunted across said third winding and a first and second diode shunting said first and second transistor and poled in a direction opposite to the transistor conductivity.

4. An uninterruptible power supply as defined in claim 3 wherein said first means for controlling said gating means includes means for monitoring a load voltage and pulse generating means responsive to said means for monitoring for generating a pulse to bias said first and second transistors simultaneously conducting for a controlled time interval, and said second means for controlling includes means for generating a drive signal to extend conduction in one of said first and second transistors beyond the interval of simultaneous conduction.

5. An uninterruptible power supply as defined in claim 4 wherein said second means for controlling includes means for alternating the extension of conduction from one to another of said first and second transistors.

6. An uninterruptible power supply comprising
a power transformer having first and second primary windings and a secondary winding,
means for accepting an AC signal having a first frequency including a frequency responsive impedance coupled to said first primary winding, said impedance being relatively small at the first frequency of the AC signal,
means for controlling power flow through said power transformer coupled to said second primary winding including means for accepting a source of DC voltage, energy storage means for storing energy from said source of DC voltage, switching means for selectively connecting a first and second conducting path arrangement in response to a signal condition of said secondary winding, said first conducting path arrangement operating to short-circuit said second primary winding for a controlled time interval to pulse modulate transmission from said first primary winding to said secondary winding and said second conducting path arrangement operating to couple said energy storage means to deliver power at a second frequency higher than said first frequency to said secondary winding to supplement energy from said first primary winding.

7. An uninterruptible power supply as defined in claim 6 wherein said frequency responsive impedance comprises a linear inductor.

8. An uninterruptible power supply as defined in claim 6 wherein said energy storage means comprises an energy storage inductor connected in said second conducting path arrangement.

9. An uninterruptible power supply as defined in claim 6 wherein said switching means comprises a first and second switching transistor connected in series and shunting said second primary winding, a junction of said first and second transistors being coupled through said energy storage means to a midpoint of said second primary winding wherein said first conducting path arrangement includes said first and second transistors simultaneously biased conducting and said second conducting path arrangement includes one of said first and second transistors biased conducting to complete a conduction path through said energy storage means, said midpoint of said second primary winding and a portion of said second primary winding.

10. An uninterruptible power supply as defined in claim 9 wherein said first and second transistors are each shunted by a first and second diode poled in a direction opposite the conductivity polarity of the first and second transistors whereby the polarity of the AC signal controls a current direction flow in the first conducting path arrangement to achieve coherency.

11. An uninterruptible power supply as defined in claim 6 further including means for limiting the voltage across said energy storage means.

12. An uninterruptible power supply as defined in claim 11 wherein said energy storage means comprises an energy inductor and said means for limiting includes a winding magnetically coupled to said energy storage inductor and a diode connected in series thereto, said diode and winding shunting said means for accepting a source of DC voltage.

13. An uninterruptible power supply comprising
first input means including means to accept a source of primary power,
second input means including means to accept a source of reserve power,
output means to accept a load to be energized,
a power flow path means coupling said first and second input means to said output means, and
power flow control means including control circuit means the flow of energy from said first and second input means through said power flow path means to said output means including gating means connected to said second input means for disabling power transmission through said power flow path means for controlled intervals of time in order to modulate power flow from said first input means to said output means and means for delivering power from the source of reserve power to said output means including energy storage means operative for storing energy in response to operation of said gating means in disabling power transmission through said power flow control means, said gating means being operative in response to said control circuit means to couple energy from said energy storage means to said second input means.

14. An uninterruptible power supply as defined in claim 13 wherein said power flow path means includes a magnetic flux medium and said first and second input means and said output means includes first and second input windings and an output winding enclosing at least a portion of said magnetic flux medium.

15. An uninterruptible power supply as defined in claim 14 wherein said gating means includes a first and second switching device connected in series and shunting said second input winding and operative to disable power transmission through said power flow path means by shorting said second input winding.

16. An uninterruptible power supply as defined in claim 14 wherein said gating means which includes a first and second switching device joined at a common node, connected in series and shunting said second input winding, said second input winding including a center tap, said energy storage means and said reserve source of power connected in series and coupling said common node to said center tap wherein energy is stored in said energy storage means by biasing both said first and second switching devices simultaneously conducting and power is delivered to said second input winding by selectively biasing one of said first and second switching devices conducting whereby power is delivered to a portion of said second input winding as defined by said center tap.

17. An uninterruptible power supply as defined in claim 16 wherein said energy storage means comprises an energy storage inductor and said power supply further comprising voltage clamping means to limit the voltage across said first and second switching device including a series connected diode and a second inductor winding magnetically coupled to said energy storage inductor and connected in shunt with said means to accept a source of reserve power.

18. An uninterruptible power supply comprising
first, second, and third windings magnetically coupled,
means for accepting an AC signal having a first frequency including a frequency responsive impedance coupled to said first winding and having a low impedance at said first frequency,
power flow control means coupled to said second winding including first control means for repetitively shorting said second winding for controlled time intervals to provide modulate power flow at a second frequency significantly higher than said first frequency from said first winding to said third winding,
means for determining the adequacy of said modulated power flow,
means to accept a reserve power source,
energy storage means for storing energy from said means to accept a reserve power source and second control means for enabling said energy storage means to deliver energy from said second winding to said third winding when said modulated power flow is inadequate.

19. An uninterruptible power supply as defined in claim 18 wherein said power flow control means includes first and second switching devices connected in series and shunting said second winding, said second winding having a center tap and said first and second switching devices being joined at a common node, said reserve power source and said energy storage means being connected in series and coupling said center tap to said common node.

20. An uninterruptible power supply as defined in claim 19 wherein said first and second switching devices are simultaneously biased conducting to short said second winding and one of said first and second switching devices biased conducting and the other biased nonconducting in order to deliver energy from said energy storage means to said second winding.

21. An uninterruptible power supply as defined in claim 20 wherein said energy storage means is an energy storage inductor and further including clamping means for limiting the voltage across said first and second switching devices including a fourth winding magnetically coupled to said energy storage inductor, a diode connected in series thereto and the series connected diode and fourth winding shunting said means to accept a reserve power source.

22. An uninterruptible power supply as defined in claim 18 wherein said frequency responsive impedance is a linear inductor.

23. An uninterruptible power supply as defined in claim 18 wherein said third winding is coupled to means for accepting a load to be energized.

24. A no-break power supply for providing uninterruptible power to a load comprising
a high reactance transformer including first and second primary windings and a secondary winding, said second primary winding including a center tap,
means for controlling the flow of energy between said first and second primary windings and said secondary winding including first and second switching devices connected in series, joined by a common node, and coupled across said second primary winding,
input means for accepting a source of direct current energy,
inductive means for storing energy connected to said means for accepting a source of direct current energy, said input means and inductive means connected in series and coupling said center tap to said common node,
whereby said first and second switching devices are controlled to be simultaneously conducting to short said second primary winding to control power flow from said first primary winding to said secondary winding and are selectively controlled so that one of said first and second switching devices is singly conducting subsequent to a simultaneously conducting state of said first and second switching devices to permit supplementary power flow from said inductive means to said secondary winding.

* * * * *

UNITED STATES PATENT AND TRADEMARK OFFICE
CERTIFICATE OF CORRECTION

PATENT NO. : 4,038,559

DATED : July 26, 1977

INVENTOR(S) : Ping Sun Chun, Patrick W. Clarke and Kenneth W. Gardner

It is certified that error appears in the above-identified patent and that said Letters Patent are hereby corrected as shown below:

Col. 13, line 45, (claim 12) between "energy" and "inductor" insert --storage--. Col. 13, line 59 (claim 13) between "means" and "the" insert --for controlling--.

Signed and Sealed this

Fifteenth Day of November 1977

[SEAL]

Attest:

RUTH C. MASON
Attesting Officer

LUTRELLE F. PARKER
Acting Commissioner of Patents and Trademarks